United States Patent [19]

Nikulainen et al.

[11] Patent Number: 4,856,154
[45] Date of Patent: Aug. 15, 1989

[54] METHOD AND DEVICE IN AN ADJUSTABLE CROWN ROLL

[75] Inventors: Osmo Nikulainen, Muurame; Vesa Kainu, Jyväskyl/e,uml/a/ , both of Finland

[73] Assignee: Valmet Oy, Finland

[21] Appl. No.: 124,256

[22] Filed: Nov. 23, 1987

[30] Foreign Application Priority Data

Nov. 21, 1986 [FI] Finland .................................. 864759

[51] Int. Cl.[4] ............................................ B21B 31/24
[52] U.S. Cl. .................... 29/113.1; 29/116.1; 29/116.2
[58] Field of Search ................... 29/113.1, 116.1, 116.2

[56] References Cited

U.S. PATENT DOCUMENTS

| | | | |
|---|---|---|---|
| 3,838,480 | 10/1974 | Depuy | 29/116 AD X |
| 3,885,283 | 5/1975 | Biondetti | 29/116 AD |
| 4,092,916 | 6/1978 | Link et al. | 29/116 AD X |
| 4,241,482 | 12/1980 | Biondetti | 29/116 AD |
| 4,319,522 | 3/1982 | Marchioro et al. | 29/116 AD X |
| 4,327,468 | 5/1982 | Kusters et al. | 29/116 AD |
| 4,477,954 | 10/1984 | Molinatto | 29/116 AD |

FOREIGN PATENT DOCUMENTS 600037 6/1978 Switzerland .
1546778 5/1979 United Kingdom .

Primary Examiner—Timothy V. Eley
Assistant Examiner—Frances Chin
Attorney, Agent, or Firm—Steinberg & Raskin

[57] ABSTRACT

Method in a variable-crown roll in which hydraulic loading elements or a series of hydraulic loading elements are used. Such series of elements acts along a plane of a nip that can be formed between the variable-crown roll and a counter-roll thereof, with such elements or series being situated between a central axle of the roll and a cylindrical mantle which is rotatable about the central axle through radial bearings. The central axle is supported by axle journals thereof on deflection bearings. In the method, the central axle is pivoted about the deflection bearings thereof over an angle which is within a range of about 30° to 180°. By the effect of such pivoting, the variable-crown roll and the mantle thereof are shifted away from the nip, so that the nip is opened. This shifting is produced by the axis of pivoting of the deflection bearings being situated by a certain eccentricity distance further away from a nip line of the closed nip, than the axis of rotation of the roll mantle.

24 Claims, 3 Drawing Sheets

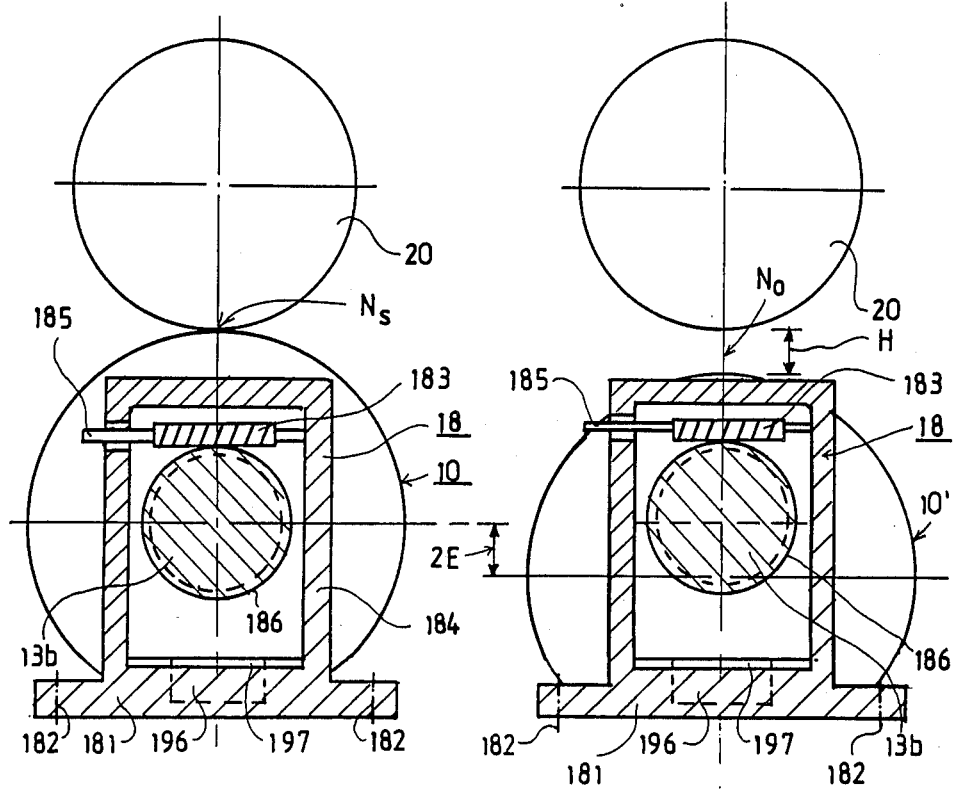
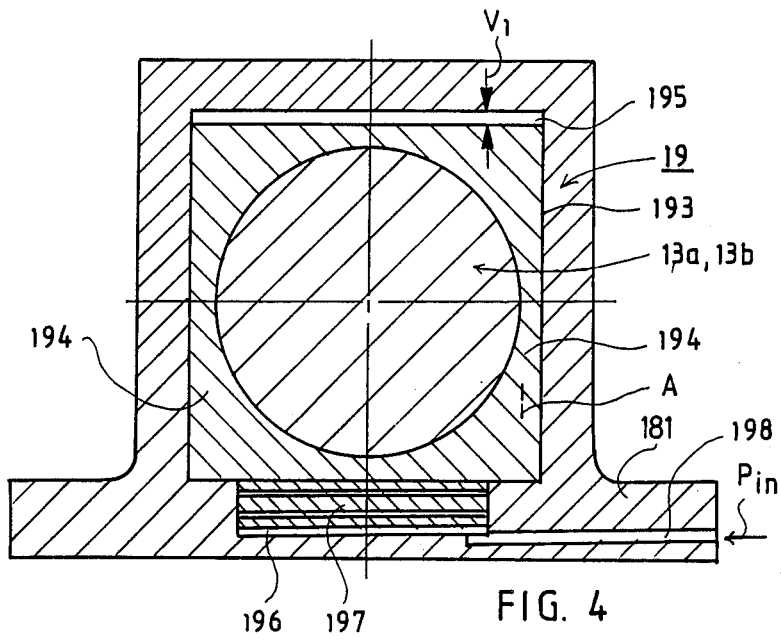

METHOD AND DEVICE IN AN ADJUSTABLE CROWN ROLL

BACKGROUND OF THE INVENTION

The present invention concerns a method in an adjustablecrown roll (variable-crown roll), in which hydraulic loading elements or a series of hydraulic loading elements are used and which are fitted so as to act in a plane of a nip that can be formed between the variable-crown roll and a counter roll thereof. The elements of series are fitted between a central axle of the variable-crown roll and a cylindrical mantle revolving about the axle and preferably controlled by means of radial bearings. The central axle is supported by means of axle journals thereof on deflection bearings or equivalent.

The present invention further concerns a roll device intended for carrying out the method of the invention, the roll device comprising a massive central axle and a roll mantle revolving on the central axle through radial bearings or under equivalent control. A series of glide-shoe loading-piston elements or a corresponding pressure fluid chamber arrangement is fitted in a space between the axle and the roll mantle, by means of which the profile of the nip that can be formed between the variable-crown roll and a counter-roll thereof can be regulated. The glide-shoe piston series or equivalent can be fitted so as to act substantially in a plane of the nip. The stationary axle is supported from outside the roll mantle, by means of deflection bearings or equivalent.

In paper machines, such rolls are commonly used to form a dewatering press nip, a smoothing nip, or a calendering nip with a counter-roll. In these purposes of use, it is important for the distribution of the linear load of the nip, i.e. the profile in the axial direction of the rolls, to be made unvarying or adjustable as desired, e.g., in order to control the moisture profile and/or thickness profile (caliber) of the web in the transverse direction. For this purpose, variable-crown rolls or adjustable-crown rolls (the term "variable-crown roll" will be used to denote all such rolls below) are known in the prior art, by means of which attempts have been made to act upon the distribution of the linear load in a nip.

Several different variable-crown rolls for paper machines are known in the prior art. As a rule, these roll comprise a massive or tubular stationary roll axle and a roll mantle rotatably arranged about the axle. Arrangements of glide shoes and/or a chamber or a series of chambers for pressure fluid are fitted between the axle and the mantle to act upon an inner face of the mantle, so that the axial profile of the mantle at the nip can be aligned or adjusted as desired. As a rule, the nips formed by such rolls such as press nips or calendering nips, are loaded by means of loading forces applied to the axle journals of the variable-crown roll and of its counter-roll.

When variable-crown rolls are used as press rolls, it is necessary to open the nips formed thereby, e.g. for servicing operation such as replacement of press felts. When a variable-crown roll is used as a calender roll, the calendering nips must be opened, e.g. for the threading of the web.

So-called variable-crown rolls without loading arms are also known in the prior art, in which the stroke length of the piston-cylinder elements of the hydraulic loading components has been arranged to be large enough so that it is also sufficient for producing the opening movement and correspondingly the closing movement of the nip, and so that loading arms acting upon the ends of the roll axle and provided with power units or corresponding cylinder devices, are not even needed at all. In such variable-crown rolls without loading arms, the hydraulic loading elements which act upon the inner face of the roll mantle also produce the nip pressure loading per se, in addition to crown variation and nip profiling.

The prior-art variable-crown rolls without loading arms have favorable properties of their own, but they have also involved, e.g., the drawback of it becoming necessary to reduce the dimensions and the rigidity of the stationary central axle of the variable-crown roll, because a certain intermediate space must be provided between the roll mantle and the central axle for the opening movement, in addition to space that is required at the opposite side relative to the hydraulic loading elements for the deflection of the central axle.

In view of the structural and functional properties of a variable-crown roll, it is however of extreme importance that the central axle must be made as rigid as possible, explicitly in the plane of the nip and in the direction of the hydraulic loading elements. In the opposite direction, the rigidity of the central axle is not of as great importance.

SUMMARY OF THE INVENTION

Accordingly, it is an object of the present invention to provide a method and a device which can be applied in variable-crown rolls in such a manner that a nip formed by the roll can be opened and closed by means of simple method steps and device solutions or manipulations.

It is a further object of the present invention to provide a method and a device which can be accomplished so that rigidity of a central axle of a variable-crown roll in a nip plane and in a direction of loading of loading elements, can be maximized.

These and other objects are attained by the present invention which is directed to a method of opening a nip formed between a variable crown roll and a counter-roll. The variable crown roll has a central axle supported by axle journals thereof and a substantially cylindrical mantle rotatably mounted with respect to the axle. The method involves pivotally mounting the axle so that an axis of pivoting thereof is offset from an axis of rotation of the mantle, when the nip is closed. The axle is pivoted about the pivoting axis thereof from a position in which the nip is closed and can be loaded, whereby the mantle is shifted away from the counter-roll by the pivoting of the axle, to open the nip.

The mantle may be rotatably mounted upon the axle through radial bearings, while the axle may be pivotally mounted with the axis of pivoting thereof being situated a certain eccentricity distance further away from a line of the nip than the rotation axis of the mantle, when the nip is closed. The variable crown roll may be fitted with hydraulic loading elements disposed to act in a plane of the nip, while axle journals of the axle may be supported on deflection bearings (whereby the axle is pivoted about the deflection bearings), with axes of pivoting of the deflection bearings being situated the certain eccentricity distance further away from the nip line than the mantle axis of rotation, when the nip is closed. The axle may be pivoted over an angle in the range from about 30° to 180° from the position in which the nip is closed.

The present invention is also directed to a variable crown roll, comprising a central axle and a substantially cylindrical mantle rotatably mounted with respect to the axle to form a nip with a counter-roll. The axle is supported from outside of the mantle and is pivotally mounted about a longitudinal axis thereof, with the pivoting axis being offset from an axis of rotation of the mantle, when the nip is closed. Thus, pivoting of the axle away from the position when the nip is closed, opens the nip.

The roll may additionally comprise a series of glide shoe-loading piston elements fitted between the central axle and the roll mantle, to act in a plane of the nip, with the mantle being rotatably mounted upon the axle through radial bearings. The axle is also pivotally mounted with the axis of pivoting thereof situated a certain eccentricity distance further away from a line of the nip than the rotation axis of the mantle, when the nip is closed.

The axle may be supported through a pair of axle journals and deflection bearings supporting the axle journals, whereby the axle is pivotally mounted in the deflection bearings with axes of pivoting of the deflection bearings being situated the certain eccentricity distance further away from the nip line than the mantle axis of rotation when the nip is closed.

A pressure fluid chamber may be fitted in a space between the central axle and roll mantle, with means for pivoting the axle from the position in which the nip is closed, also being provided. This pivoting means may constitute means for pivoting the axle at least about 30° from the position in which the nip is closed, preferably about 60° to 180° from the position in which the nip is closed.

With a view to achieving the objectives noted above and those which will become apparent below, the method of the present invention is principally characterized by the central axle in this method being pivoted about its deflection bearings or equivalent supports, over an angle which is within a range of about 30° to 180° with respect to a position in which the central axle is located when the nip is in a closed position and can be loaded, and by the effect of the pivoting defined above, the variablecrown roll and its mantle being arranged so as to be shiftable apart from the nip so that the nip is opened, this shifting being produced by the effect of the axes of pivoting of the deflection bearings being placed a certain eccentricity distance further away from a nip line of a closed nip than an axis of rotation of the roll mantle.

Further more, the roll in accordance with the present invention is principally characterized by the axle journals or equivalent of the central axle being attached to deflection bearings or equivalent which are fitted so that the central axle can pivot about its longitudinal axis, pivoting devices being fitted to act upon the central axle, by means of which the central axle can be pivoted about the pivoting axis over at least about 30°, preferably about 60° to 180°, and the pivoting axis of the deflection bearings being placed a certain eccentricity distance further away from a line of the nip than an axis of rotation of the mantle of the variable-crown roll.

In the present invention, pivoting of the central axle about its deflection bearings or equivalent provided on the axle journals or equivalent of the central axle, is utilized, these bearings already being required in order to permit the deflection produced by the nip loading of the central axle.

In accordance with the present invention, when the axis of rotation of the roll mantle is situated, in a direction of a nip plane, at a certain distance of eccentricity from the pivoting center of the pivoting bearings of the axle journals of the central axle, and when the central axle is arranged pivotal in the pivot bearings of its axle journals over at least about 30° and preferably over more than 60°, then the central axle and the roll mantle fitted thereon can be made to move apart from the mantle of the counter-roll, whereby the nip is opened.

In connection with the deflection bearings, it is possible to provide hydraulic power units or equivalent loading arms if required, by means of which the nip can be loaded. Alternatively, the nip may be arranged to be loadable and profiled exclusively by means of hydraulic loading elements or equivalent pressure-chamber arrangements provided inside the roll mantle.

BRIEF DESCRIPTION OF THE DRAWINGS

The present invention will be described in further detail below, with reference to certain exemplary embodiments thereof illustrated in the accompanying drawings, to which the present invention is in no way strictly confined. In the drawings

FIG. 3A is a sectional view along line III—III in FIG. 1, when the nip is closed;

FIG. 3B is a view similar to FIG. 3A, but when the nip has been opened by means of the method and the device in accordance with the present invention; and FIG. 4 is a schematic sectional view along line IV—IV in FIG. 1 omitting illustration of bearing means for clarity.

DESCRIPTION OF THE PREFERRED EMBODIMENTS

Figure 1:
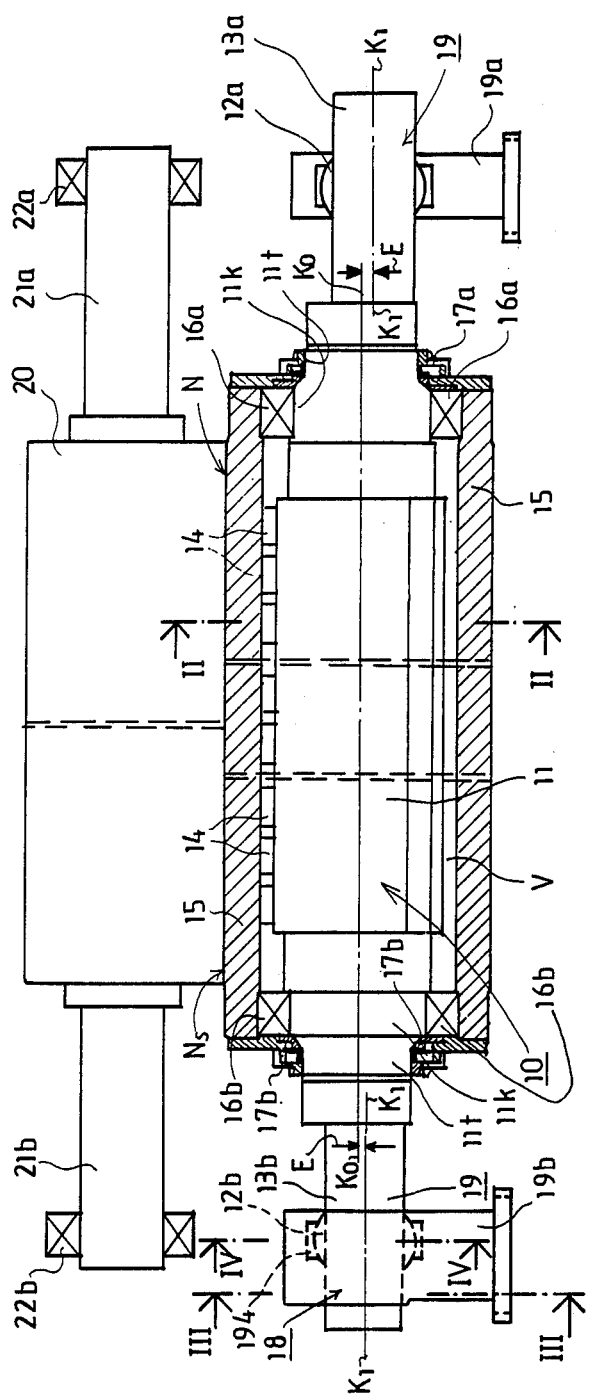
FIG. 1 is an illustration of a variable-crown roll in accordance with the present invention, forming a closed nip with a counter-roll.

FIG. 1 illustrates a variable-crown roll 10 which forms a nip N with a counter-roll 20. The counter-roll 20 is journaled through axle journals 21a and 21b thereof, to revolve in bearings 22a, 22b. The supports of the bearings 22a, 22b are stationary, or are provided with nip-loading means.

The variable crown-roll 10 in accordance with the present invention comprises a stationary massive central axle 11, which is supported on deflection bearings 12a and 12b through the axle journals 13a and 13b thereof. The deflection bearings 12a and 12b are supported on a frame through stationary bearings supports 19a and 19b. The central axle 11 is provided with a series of hydraulic cylinder-piston glide-shoe elements 14 in a manner known in and of itself, with adjustable pressure of hydraulic fluid being passed into the cylinder of each of the elements 14. Lubricated glide shoes are pressed against a smooth inner face of the roll mantle 15. By means of the glide shoes of the elements 14, it is possible to generate a pressure profile adjustable in a longitudinal direction of the nip N for the purpose of regulating and controlling moisture or caliper of the web.

A space V is situated between the revolving roll mantle 15 and the central axle 11, which is dimensioned so that when the central axle is maximumly deflected, a gap as small as possible remains between the inner face of the roll mantle 15 and the outer side 11d of the central axle 11 at the middle of the central axle 11. In other words, the central axle 11 is dimensioned as rigidly as possible in a plane of the nip N.

The roll mantle 15 is journaled to revolve about the central axle 11 by means of radial bearings 16a and 16b which are fitted about neck portions 11k situated at both of the end portions of the central axle 11, as illustrated in FIG. 1. An axis of rotation of the mantle 15 is denoted by $K_o$—$K_o$. The neck portions 11t of the central axle 11, which are situated outside the neck portions 11k of the bearings 16a and 16b, are provided with seals 17a and 17b which seal the inner space V of the mantle 15 and make it oil-tight.

The axle journals 13a and 13b of the central axle 11 are fitted in deflection bearings 12a and 12b. In the present invention, in addition to permitting deflection of the central axle 11, the deflection bearings 12a and 12b also permit pivoting of the axle journals 13a and 13b about pivoting axes $K_1$—$K_1$ thereof. It is an essential feature of the present invention that the pivoting axes $K_1$—$K_1$ of the deflection bearings 12a and 12b are, in the nip plane, most distant from the nip N by a certain eccentricity gap E than the axis of rotation $K_0$—$K_0$ of the roll mantle 15. With the provision of this eccentricity E, opening of the nip N is achieved in accordance with the present invention.

Figure 2B:
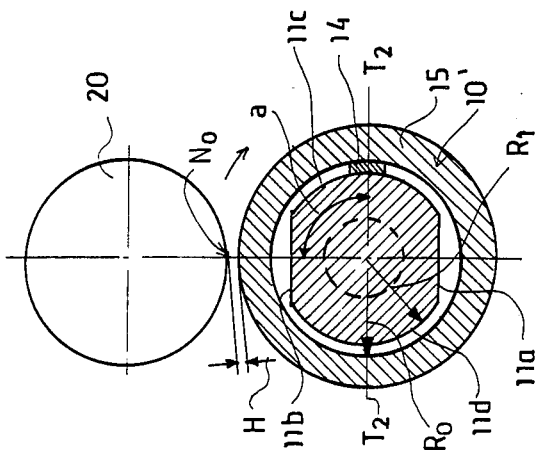
FIG. 2B is a vertical sectional view of the nip similar to FIG. 2A, but with the nip having been opened by means of the method of the present invention.
Figure 2A:
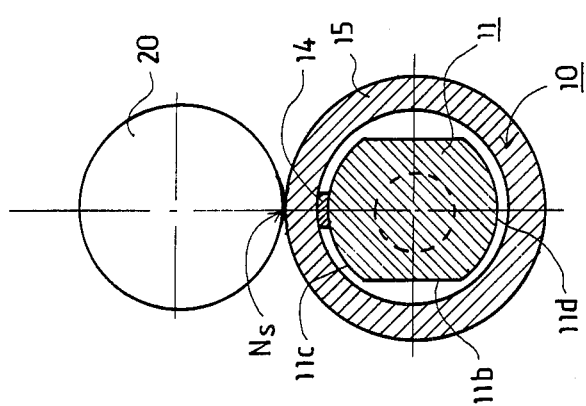
FIG. 2A is a sectional view along line II—II of FIG. 1, with the nip thus being closed.

The nip N is in closed position $N_S$ in FIGS. 1 and 2A, while in FIG. 2B, the variable-crown roll 10 has been shifted to a lower level by pivoting of the axle journals 13a and 13b over an angle a by means of the pivoting device 18, whereby the nip N has reached an opened position $N_o$ in which the gap thereof is denoted by H. When the pivoting angle a is a=about 90°, then the axis of rotation $K_0$—$K_0$ of the roll 10' mantle 15 is displaced into the same horizontal plane as the pivoting axis $K_1$—$K_1$ of the axle journals 13a and 13b, i.e. downwardly by the gap or distance E and into the horizontal plane to a side therefrom, i.e. into plane $T_2$—$T_2$. When the axle journals 13a and 13b and the variable-crown roll 10 attached thereto are pivoted about 180°, which is possible and especially advantageous according to the present invention, then the axis of rotation $K_0$—$K_0$ of the mantle 15 is displaced by a distance 2E downwardly, as compared with the position required in the closed nip $N_S$, i.e. to a level lower than the pivoting axes $K_1$—$K_1$ by the gap or distance E, whereby the nip gap H is enlarged accordingly and becomes about twice as large as compared with the gap H illustrated in FIG. 2B.

As a rule, the pivoting angle a of the central angle must be at least about 30°, preferably at least about 60°, and most advantageously about 90° to 180°.

The central axle 11 is formed, for example, to have planar sides 11a and 11b, as well as partially planar side 11c which includes the loading elements 14, with a side 11d of the axle 11 that is situated opposite to the loading elements 14 either consisting of planar faces or being curved in a corresponding manner so that a radius of curvature $R_1$ thereof is slightly smaller than or substantially equal to an inner radius $R_0$ of the mantle 15. The side 11c is preferably provided with edge chamferings.

FIGS. 3A and 3B illustrate an embodiment of the rotating device of the present invention, by means of which the axle journals 13a and 13b are pivoted for carrying out the present invention. The rotating device comprises a box portion 184 which is attached to frame parts through a footing 181 by means of screws 182. In connection with the pivoting device 18, a screw 183 is mounted with a counter-threading 186 thereof being situated on the shaft 13b or attached to the same. In other words, a toothed rim 186 is provided about one of the axle journals 13b of the central axle 11, with a cogwheel or screw 183 provided in connection therewith and which can be driven by means of power units through a shaft 185 or equivalent, so as to open $N_0$ or close $N_S$ the nip N.

The shaft 185 of the screw 183 may be driven, e.g., by an hydraulic motor (not illustrated) when the screw 183 is rotated so that the axle 11 of the journal 13b revolves, e.g. about 180°. Then the nip $N_S$ is displaced into the open position $N_0$, which is illustrated in FIG. 3B.

Hydraulic loading devices can be provided in connection with the bearing supports 19a and 19b of the variable-crown roll 10 as illustrated in FIG. 4, by means of which the basic loading of the nip N between the rolls 10 and 20 can be arranged. These devices comprise hydraulic loading means which act upon a support or stationary outer ring 194 of the deflection bearings 12a and 12b and which load and displace the bearings 12a and 12b in the direction A, i.e. in the plane of the nip N. For this purpose, the outer rings 194 of the bearings 12a and 12b are fitted in vertical guides 193, with an intermediate space 195 being provided thereabove which permits displacement of the axle journals 13b and 13c towards the nip by the distance $V_1$, as illustrated in FIG. 4.

The hydraulic loading devices comprise a piston 197 situated in a bore 196 in the footing 191 of the support 19. A loading pressure $P_{in}$ can be passed to and underneath the piston 197 through a duct 198, to produce the nip pressure. In other words, the stationary or supporting outer rings 194 of the deflection bearings 12a, 12b are fitted in guide parts 193, so that the outer ring portions 194 are displaceable in the guides 193 in the direction of the nip N. Furthermore, the frame parts 184 situated in connection with the guiding parts 193, are provided with hydraulically loadable cylinder-piston devices 196, 197, into which pressure $P_{in}$ of a pressure fluid can be passed to load the nip N through the deflection bearings 12a, 12b or equivalent.

The method and the device of the present invention can also be applied to such variable-crown rolls without loading arms, in which the roll mantle 15 is attached more freely on the central axle 11 instead of through radial bearings 16a and 16b, e.g. by means of various controls known in and of themselves. In other words, it is possible for part of the opening gap H of the nip N to be produced, in addition to the effect of the eccentricity distance E, by means of movement that may take place between the roll mantle 15 and the central axle 11 thereof, which is permitted by such controls which differ from the radial bearings. Therefore, the mantle 15 of the variable-crown roll may be arranged to be both rotatable about its central axle 11 thereof, and guided in such a manner that the roll mantle 15 can be displaced relative to the central axle 11.

The preceding description of the present invention is merely exemplary, and is not intended to limit the scope thereof in any way.

We claim:

1. Method of opening a nip formed between a variable crown roll and a counter roll, the variable crown roll having a central axle supported by axle journals thereof and a substantially cylindrical mantle rotatably mounted with respect to said axle, comprising the steps of
pivotally mounting said axle so that an axis of pivoting thereof is offset from an axis of rotation of said mantle and substantially parallel thereto when the nip is closed, and
pivoting said axle about the pivoting axis thereof from a position in which the nip is closed and can be loaded,
whereby the mantle is shifted away from the counter roll by the pivoting of the axle, to open the nip.

2. The method of claim 1, wherein the mantle is rotatably mounted upon the axle through radial bearings.

3. The method of claim 1, wherein the axle is pivotally mounted with the axis of pivoting thereof being situated a certain eccentricity distance further away from a line of the nip than the rotation axis of the mantle, when the nip is closed.

4. The method of claim 3, wherein the axle journals of the axle are supported on deflection bearings wherein the axle is pivoted about the deflection bearings, with axes of pivoting of the deflection bearings being situated the certain eccentricity distance further away from the nip line than the mantle axis of rotation when the nip is closed.

5. The method of claim 3, wherein the axle journals of the central axle are pivoted about 90° from the position in which the nip is closed,
whereby an opening gap of the opened nip is substantially equal to the eccentricity distance between the respective pivoting and rotation axes.

6. The method of claim 3, wherein the central axle is pivoted over an angle of about 180° around the pivoting axes of the deflection bearings,
whereby an opening gap of the opened nip is about twice said eccentricity distance.

7. The method of claim 1, wherein the variable crown roll is fitted with an hydraulic loading element or a series of hydraulic loading elements, disposed to act in a plane of the nip.

8. The method of claim 1, wherein the axle is pivoted over an angle in the range of about 30° to 180° from the position in which the nip is closed.

9. The method of claim 1, wherein pivoting of the central axle is carried out through a power transmission mechanism fitted in connection with one of the axle journals.

10. A variable crown roll, comprising:
a central axle and a substantially cylindrical mantle rotatably mounted with respect to said axle to form a nip with a counter roll,
said axle being supported from outside of said roll mantle, wherein
said axle is pivotably mounted about a longitudinal axis thereof, and
said axle is mounted with the pivoting axis thereof being offset from an axis of rotation of said mantle and substantially parallel thereto when the nip is closed,
whereby pivoting of the axle away from a position thereof when the nip is closed, opens the nip.

11. The combination of claim 10, additionally comprising a series of glide shoe-loading piston elements fitted between the central axle and roll mantle to act in a plane of the nip.

12. The combination of claim 10, additionally comprising radial bearings through which said mantle is rotatably mounted upon said axle.

13. The combination of claim 10, wherein the axle is pivotally mounted with the axis of pivoting thereof being situated a certain eccentricity distance further away from a line of the nip than the rotation axis of the mantle, when the nip is closed.

14. The combination of claim 13, additionally comprising
a pair of axle journals supporting said axle, and
deflection bearings supporting the axle journals, wherein said axle is pivotably mounted in said deflection bearings,
with axes of pivoting of the deflection bearings being situated the certain eccentricity distance further away from the nip line than the mantle axis of rotation when the nip is closed.

15. The combination of claim 14, additionally comprising
means for pivoting said central axle, connected to one of said axle journals adjacent one of said deflection bearings.

16. The combination of claim 15, wherein said pivoting means are positioned on a side of said respective bearing away from said mantle.

17. The combination of claim 15, wherein said pivoting means comprise
a toothed rim affixed to said respective axle journal, and
a cogwheel or screw engaged with said toothed rim, and having a shaft.

18. The combination of claim 14, additionally comprising
means for hydraulically loading the nip when comprise outer support rings of said deflection bearings outer support rings of said deflection bearings,
a substantially vertical guide in which each said outer support ring is displaceably fitted, and
an hydraulically loadable cylinder-position device for loading said outer ring, and into which pressure from a pressure fluid can be passed to load the nip through the deflection bearings.

19. The combination of claim 18, wherein said vertical guides and cylinder-piston devices are respectively situated upon and in parts of a stationary frame.

20. The combination of claim 10, additionally comprising
a pressure fluid chamber fitted in a space between said central axle and roll mantle.

21. The combination of claim 10, additionally comprising
means for pivoting said axle from the position in which the nip is closed.

22. The combination of claim 21, wherein said pivoting means constitute means for pivoting said axle at least about 30° from the position in which the nip is closed.

23. The combination of claim 22, wherein said pivoting means constitute means for pivoting said axle about 60° to 180° from said position in which the nip is closed.

24. The combination of claim 10, wherein said mantle is mounted to be displaceable with respect to said axle when said axle is pivoted.

* * * * *